April 29, 1958 D. D. CHRISTENSEN 2,832,945

METHOD AND APPARATUS FOR COMPARING RELATIVE CONDITIONS OF MAGNETIZATION IN A MAGNETIZABLE ELEMENT

Filed Jan. 26, 1952

INVENTOR

Donald D. Christensen

BY Robert M. Dunning

ATTORNEY

United States Patent Office 2,832,945

Patented Apr. 29, 1958

2,832,945

METHOD AND APPARATUS FOR COMPARING RELATIVE CONDITIONS OF MAGNETIZATION IN A MAGNETIZABLE ELEMENT

Donald D. Christensen, White Bear Lake, Minn., assignor, by mesne assignments, to Librascope, Incorporated, a corporation of California Application January 26, 1952, Serial No. 268,433

10 Claims. (Cl. 340—174)

This invention relates to a method and apparatus for comparing relative conditions of magnetization in a magnetizable element. Although the invention is susceptible to a variety of uses and applications, more particularly the invention is concerned with the determination of relative states of magnetization in a memory system wherein a magnetizable element or member is utilized for the storing of information in the form of states of magnetization.

As a preliminary for an understanding of the basic concepts involved in the instant invention, it will be appreciated that in all storage and memory systems it is necessary to be able to recover the information stored if such information is to serve a useful purpose. It is desirable and advantageous in many instances to be able to read the stored information without taking it out of storage, and in some memory systems this can be done.

A simple example of such a system, as referred to immediately above, is a system wherein binary information is stored in a relay capable of having its contact arm assume two physically distinguishable positions; one position can be used to represent zero and the other position the number one. Obviously, the contacts carried by the relay arm may be so connected that a readily observable output signal is produced which is a function of the particular position of the relay arm. This output signal or indication may be continuous as the relay remains in that particular position. Stated otherwise, the position of the relay contact arm, and hence the information this position represents, may be observed continuously in the form of an output signal without disturbing its position.

On the other hand, in certain other systems the process of reading or observing the information is destructive, and this has been especially true in regard to magnetic storage systems where the information stored is in terms of the magnetic state of a magnetic element. When adapted for binary use, a system of this kind has its magnetic element driven by input storage signals between two limiting states or regions of magnetic saturation. Whether the stored information is one or zero is represented by which of these two limiting states or regions of saturation obtain at a given time. In order to determine the state of the magnetic element a "read-out" pulse is applied having a predetermined polarity, and if the magnetic element is saturated in a direction such that the read-out pulse tends to further saturate the magnetic element, then an output signal observed on a secondary winding will be relatively small because very little flux change will take place. Conversely, should the saturation state or region of the magnetizable element be in the opposite sense or direction, then a relatively large output pulse will be obtained. The information stored in the core is thus observed in terms of the character of the produced output pulse, that is, whether large or small. This procedure, of course, entails a most serious disadvantage, for if the output pulse is large, it means that the output pulse is obtained by swinging the magnetic element into the region of saturation in the opposite direction, thereby destroying the stored information as it is read-out.

One method of retaining the stored information when it is read out under conditions of the kind described above, which has been proposed by others working in this field, is to take it out of one magnetic element and store it in another, observing the information in the process of transfer. Another method that has been proposed is to read out the information, store it temporarily in a capacitor, and then re-cycle it back into the magnetic element after it has been observed. Various other re-cycling methods have been proposed. However, these methods are all actually destructive and the re-cycling is simply a method of recovery after the destructive read out has taken place. Further, it is of course possible to observe the magnetic state of various materials by means of relative mechanical motion, as in the use of magnetic recording tapes, drums, and the like.

The foregoing ways of observing magnetically stored information carry with them serious limitations from the standpoint of speed, cost, reliability and application. Accordingly, the primary purpose of the present invention is to obviate or minimize the disadvantages of the systems now relied upon, substituting in their stead a system and method of observing the magnetic state of a magnetic material without mechanical motions and without making a significant change in said magnetic state. The method and apparatus presently to be described will find especial value in many different applications in the design of computing machinery, servo-systems, control apparatus and the like.

For a better and more complete understanding of the invention, reference should now be had to the following specification and to the accompanying drawing in which.

In its general aspects, the invention takes cognizance of the fact that the inductance of a coil wound on a magnetic material depends on the magnetic state of the material. If the material is in magnetic saturation, the inductance will be relatively low; if the material is in some state intermediate between the two limiting states of saturation, the inductance will be greater. For the sake of uniformity and simplicity, the term "inductance" will be employed to denote the magnetic characteristic with which we are dealing, although other characteristic terms could be resorted to, for instance, permeability which increases with an increase in magnetization and vice versa in most magnetic materials. Therefore, depending on the magnetic characteristics of the particular material selected, the inductance will vary with varying magnetic states, and the inductance of any coil wound on a magnetic material will be a function of the magnetic state of that material. Thus, it will be seen that a method of observing the inductance in the environmental setting envisaged becomes a method of observing the magnetic state of the material.

If a relatively small symmetrical alternating electrical signal is applied to a coil wound on a magnetizable element or member and the magnitude and frequency of this interrogation signal are held constant, the average change in magnetization produced by said signal is not significant. In practice, though, various restrictions and limitations are imposed by the fact that idealized interrogation signals and idealized magnetic structures cannot be realized.

When an alternating signal is applied to a coil wound on a magnetizable element, the voltage developed across a secondary winding on said element will vary with changes in inductance, these inductance changes being precipitated by any change in the magnetic state of the magnetic element. Applied from an essentially constant voltage source, it will be clear that such a signal will cause no marked change in voltage across the winding that is used for applying the signal and the significant change must be observed across a secondary winding. However, if the source is not of an essentially constant voltage, then the voltage will change across the winding used for applying the signal and a secondary winding is not necessary for observing the change in voltage, which voltage change is related to the change in inductance caused by the change in magnetization of the associated magnetizable element. Such changes, either with or without a secondary winding, may be observed with an oscilloscope, a meter, or other conventional means.

Figure 1:
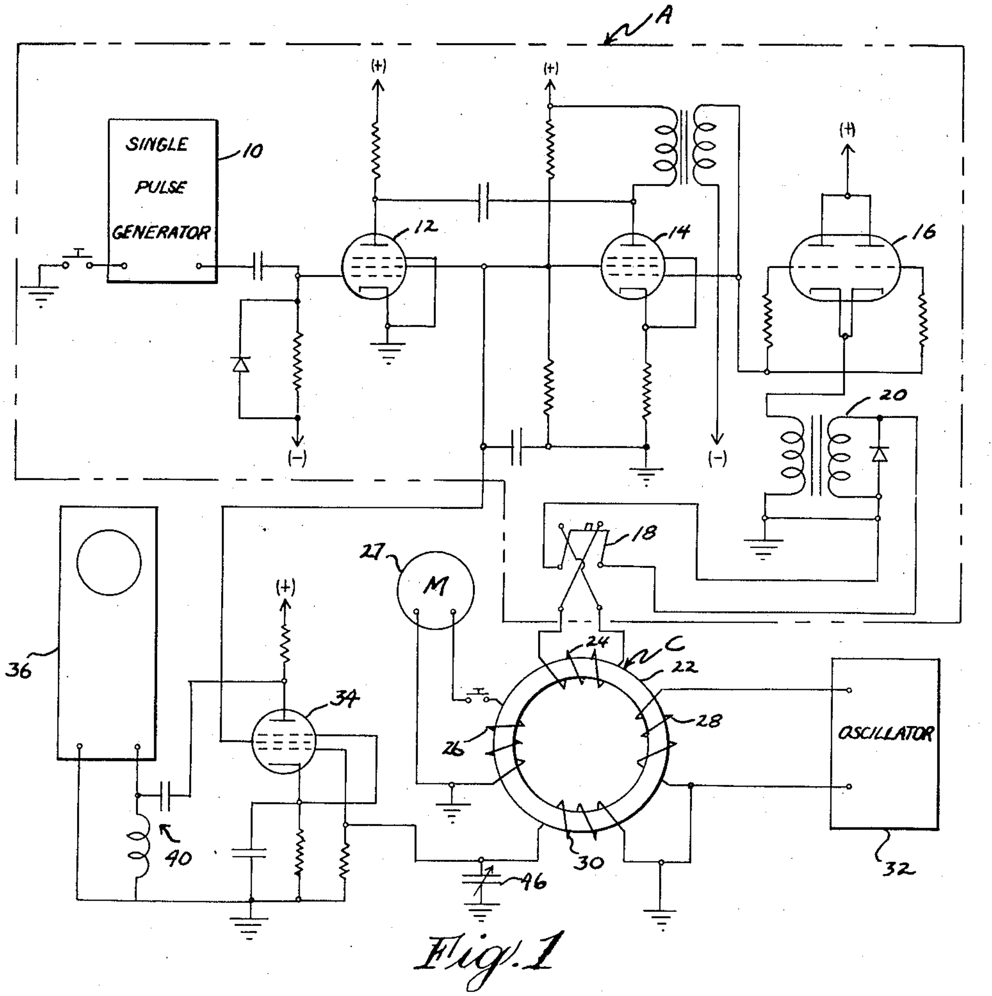
Figure 1 is diagrammatically illustrative of a circuit arrangement suitable for putting into effect the principles embodied in my invention, the circuit depicted being in conjunction with a magnetic memory system.

Referring now to Figure 1 for a description of the circuitry there illustrated, the portion of the circuit contained within the phantom outline constitutes a pulse supply means or circuit portion generally designated by the letter A. This circuit A includes a single pulse generator 10 feeding its pulses to suitable tubes 12, 14 and 16 which are employed in applying pulses that swing a magnetizable element (presently to be described) through successive states of magnetization from a saturation in one sense to saturation in the opposite sense. A reversing switch 18 is included in this circuit for reversing the polarity of the applied pulses when it is desired to reverse the polarity of the pulses. Also included in the circuit labeled A is a pulse transformer 20 connected in the circuit of the tube 16, pulses from the generator 10 being amplified and shaped by the elements 12, 14, 16 and 20 and their associated circuitry before being delivered to the magnetizable element.

The storage means C comprises a magnetizable element or member 22 equipped with a main input winding 24 for transferring the magnetizing force produced from the pulses from the circuit A to the magnetic element 22, a main read-out winding 26 having a suitable meter 27 in circuit therewith, an interrogation winding 28 for inducing an alternating flux field of relatively small magnitude into the element 22, and lastly an auxiliary winding 30 for obtaining a derivative of the alternating flux field produced by the winding 28. The winding 24 is connected to the switch 18 and in this way the electrical pulses from circuit means A are transferred directly to the magnetic element 22 by induction and are stored magnetically in the element. Connected to the interrogation winding 28 is an A. C. signal source 32, which may be an audio oscillator producing an A. C. wave of about fifteen kilocycles and approximately fifty millivolts peak to peak; it will be understood that other sources may be utilized, the one mentioned being only illustrative. However, in making any selection of signal source 32 it is to be borne in mind that a relatively small alternating current signal for interrogation purposes is to be preferred. If the A. C. interrogation signal is excessively large, it may have the effect of partial demagnetization or some other change in the magnetic state of the magnetic element, but with restricted amplitude of the signal this effect is substantially non-existent. As a guide to the selection of any particular amplitude, one must consider the availability and cost of suitable amplifying equipment where the interrogation signal is quite small, and also it is necessary to consider the magnitude of the stored pulses, it being important to keep any peak magnetic effect of the A. C. signal less than any stored pulse or the sum of a number of pulses. When proper consideration is given to the above governing factors, the A. C. interrogation signal may be applied continuously from the oscillator 32 without detrimental effect. It will be appreciated that the frequency of the A. C. signal may be varied to suit existing conditions and available apparatus, there being various advantages to be gained in the selection of different frequencies for particular installations. In some cases frequencies considerably above the audio frequency range have advantages.

The A. C. interrogation signal from the source 32 is coupled inductively into the winding 30 and the output from the winding 30 may be suitably amplified by means of an amplifier tube 34 and then fed to an oscilloscope 36, a meter, other suitable observing means, or into additional circuitry as required by any particular application involved. The magnitude of the alternating current signal appearing at 36 is a function of the degree of magnetization of the magnetic core 22.

Figure 2:
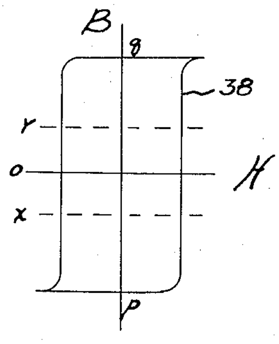
Figure 2 is a graphic representation of a hysteresis curve having a substantially rectangular form.

A typical hysteresis curve 38 for placing into effect the principles involved in this invention is shown in Figure 2, the flux B being plotted against the magnetizing force H. As shown, the curve 38 is substantially rectangular, produced by having the element 22 of a nickel-iron, grain oriented alloy, known in the industry by the name "Deltamax," the magnetic element being a ribbon wound toroid. Of course, other materials may be used, possessing other magnetic characteristics which may be more or less desirable than "Deltamax." Such materials include "Orthonik," "Permalloy," "Supermalloy" and others, most of these materials having essentially rectangular hysteresis loops, a desirable feature in connection with magnetic storage systems. However, it is to be distinctly understood that the principles involved in this invention do not demand a rectangular hysteresis curve, it only being necessary that the inductance or permeability change with a change in degree of magnetization.

The invention also contemplates that in some applications it would be desirable to observe the output indicating signal in terms of its harmonic content, or in terms of a specific harmonic, rather than its fundamentals. To do this, a suitable filter 40 of approximate inductance and capacitance, producing a high pass or band pass design, is inserted either in the input or output of the amplifier tube 34, the latter position being depicted in Figure 1, or at some subsequent point in additional circuitry suitable for satisfying the demands of a given installation. Observing the harmonic rather than the fundamental in using some magnetic element materials and associated circuitry will produce a more significant change in the observed signal for a given change in the magnetic state of the element. Generally, the second harmonic is the most suitable one.

Observation of the harmonic rather than the fundamental is also valuable in providing an indication of the magnetic state of the magnetic element with respect to the demagnetized state which is intermediate the two opposite saturation limits. Referring to the typical hysteresis loop 38 of Figure 2, the demagnetized state of the element 22 is represented as O and the two states of saturation as $p$ and $q$ respectively. The two points or levels of magnetization indicated as $x$ and $y$ represent the same magnitude or degree of magnetization, but in opposite directions. If the magnetic element is magnetized at $x$, then the second harmonic (or which ever harmonic has been selected for analysis) of the output indicating signal obtained in accordance with the system described above will differ in phase from the corresponding harmonic observed when the magnetic element is magnetized to the level $y$. Furthermore, there is some change in the phase of the second harmonic depending on the direction in which the magnetic element was last moved, magnetically speaking. In some instances this should be known, and the above described manner offers a facile way for determining this fact.

Figure 3:
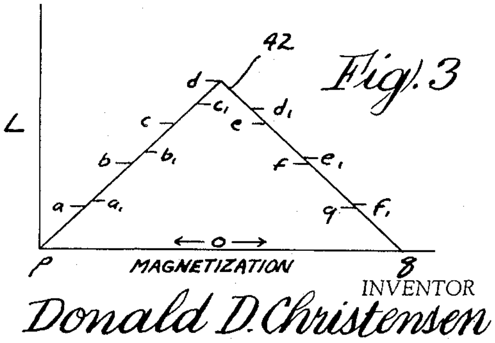
Figure 3 is another graphic representation, this representation picturing an idealized curve having inductance and degree of magnetization as its coordinates.

For the sake of explanation, Figure 3 shows an idealized curve 42 plotted with inductance as the ordinate and with the degree of magnetization of the magnetic element as the abscissa. It will be observed from this curve 42 that the inductance L increases in the region of zero magnetization. Appreciating the existence of these characteristics, it will be recognized that when the magnetic element 22 is used to store units or pulses of information in terms of a multiplicity of stable states there are several configurative methods in which the observed states of magnetization may be distributed along the curve 42. As an example, assuming that there are seven magnetic states between saturated states, the degree of inductance caused by these seven states can be indicated by the small letters, *a, b, c, d, e, f,* and *g* (without subscripts), and under this distributive arrangement there will be one, and only one, observed signal amplitude, corresponding to demagnetization of the element 22, this being the cross-over point or level from one side of the hysteresis curve to the other, designated by the letter *d* in Figure 3. This condition is achieved by the simple expedient of forming an odd number of magnetic states, that is seven without counting the two saturated states *p* and *q*. To differentiate between observations made on opposite sides of the curve 42, six different levels or states of magnetization may be used, then dividing the curve into the points bearing the small letters $a_1$, $b_1$, $c_1$, $d_1$, $e_1$, $f_1$ (with subscripts). Obviously, if levels *a, b,* and *c* (without subscripts) are employed on one side of the curve, and $d_1$, $e_1$, and $f_1$ (with subscripts) on the other side, then there will be no one to one relationship between states and duplication of observations will be avoided. Of course, it is to be understood that curve 42 is an idealized one, the symmetry of which is not easily achieved in actual practice, so that the equal quantities of stored magnetic information depicted on each side of the curve probably would not be obtained. For the purposes of understanding the principles involved, however, it is believed that the picturization of the curve 42 presents the best and easiest explanation.

It will be seen that it is within the purview of this invention to utilize a variety of alternating signals of different magnitudes and different frequencies. The interrogation signal may vary over a range of frequency and amplitude for the measurement of any specific state of magnetization so long as the observed signal is not ambiguous in the sense that it does not correspond to the signal obtained with any conditions used for the observation of some other state of magnetization. Also, where binary applications are encountered, it will be appreciated that any two states of magnetization can be selected which differ from each other to an appreciable degree, say saturated for one state and demagnetized or substantially so for the other state.

Appreciating the fact that the inductance of the magnetic element 22 will vary with various degrees of magnetization, the circuit arrangement illustrated in Figure 1, which circuit includes the inductance of the magnetic element 22 and stray capacitances, will be inherently tuned to resonate at some frequency. However, usually it is more desirable to tune to some particular frequency by introducing additional capacitances or adjusting existing capacitances. Thus, by sharply resonating the circuit for a specific value of inductance (and associated state of magnetization) at a particular selected interrogation frequency, it is possible to appreciably enhance the effect obtained by producing a desirable increase in the difference between the magnitude of the signal derived from the coil 30 as observed at 36 for various values of inductance, hence for various values of magnetization. Since it is obviously desirable to refrain from significantly disturbing or distorting any information stored in the element 22, it is preferable that the resonance be produced in the output portion of the system, that is in the output from the coil 30. Accordingly, I have shown a variable capacitor 46 in parallel relation with the coil 30. In most applications the circuit would be tuned to resonate at the point of maximum inductance, which inductance will ordinarily correspond to the zero state of magnetization or the region approximately zero. Stated otherwise, by virtue of resonant tuning of the capacitor 46 for the particular inductance involved it is possible to effect a greater change in the magnitude of the output signal or flux derivative for any given change in inductance.

The aforementioned method and system may be used to determine the value of an inductance in a resonant circuit. This is accomplished by holding the capacitance constant and varying an applied alternating signal, noting the frequency at which the maximum signal is developed across the tuned circuit and calculating the inductance in accordance with standard formulas. In this invention this is used as a means of determining the degree of magnetization of the magnetic material associated with the inductive circuit. Further, this value is used to determine the magnitude of the stored information which is represented by this degree of magnetization.

While it is thought fully apparent from the foregoing description, it is to be distinctly understood that the terms "magnetic," "magnetized" and the like are to be construed as including "demagnetized" or "zero" states of magnetization.

In conclusion, it is to be noted that the method and apparatus involved in the instant invention deal with an arrangement wherein the magnetic state of a magnetizable element may be observed continuously in terms of a flux derivative obtained from an alternating magnetizing force, the value of which is preferably kept within relatively low limits, without changing to any significant extent the magnetic state of said magneitzable element. The invention may be applied to magnetic elements used for the storage of binary information where only two different magnetic states are used, or with magnetic elements for the storage of information based on a higher radix where a multiplicity of magnetic states are utilized. In its ultimate analysis, it will be clear that this invention will find utility in any situation where it is desirable to observe the magnetic state of a magnetizable material without mechanical motions and without significant change in the state of magnetization of such material.

It should be appreciated that the flux level produced in the magnetic member 22 is dependent upon the voltage introduced to the winding 24 and upon the polarity and duration of this voltage. For this reason, it is said by persons skilled in the art that "volt-seconds" are applied to the magnetic member to control the production of flux levels in the member.

In accordance with the patent statutes, I have described the principles of construction and operation of my method and apparatus for comparing relative conditions of magnetization in a magnetizable element, and while I have endeavored to set forth the best embodiment thereof, I desire to have it understood that this is only illustrative thereof and that obvious changes may be made within the scope of the following claims without departing from the spirit of my invention.

I claim:

1. A system for determining relative magnetic states comprising a fixed magnetizable element, first, second and third coil means inductively associated with said element, pulse producing means connected to said first coil means for introducing magnetic pulses of a given polarity into said element, said pulses being of sufficient amplitude to change the degree of magnetization thereof, A. C. signal producing means connected with said second coil means, the signal thus produced being of insufficient amplitude to change the degree of magnetization of said element, and means connected with said third coil means for determining changes in inductance produced by said first coil means when an A. C. signal is impressed upon said second coil means by said signal producing means.

2. A system for determining the relative polarities of two equal magnetic states comprising storage means including a magnetizable element, means for impressing upon said storage means an alternating magnetizing force, means associated with said element for deriving a signal from said magnetizing force containing a harmonic, means for obtaining a derivative of the flux produced by said harmonic for each of said equal magnetic states, and means for observing the relative phase displacement of the derivatives.

3. A system for determining relative magnetic states comprising a magnetizable element, a coil inductively associated with said element, means for impressing a relatively small alternating signal on said coil, said signal being of insufficient amplitude to noticeably change the degree of magnetization of said element, means including a second coil inductively associated with said element for deriving an output signal, and tuning means for producing resonance of said output signal.

4. A system for determining relative magnetic states comprising a magnetizable element, a coil inductively associated with said element, means for impressing a relatively small alternating signal on said coil, said signal being of insufficient amplitude to noticeably change the degree of magnetization of said element, means including a second coil inductively associated with said element for deriving an output signal, and capacitance means in circuit with said second coil for producing resonance with said second coil for one magnetic state of said element.

5. In combination, a storage means including a magnetizable member having properties for producing fluxes upon the application of volt-seconds to the member and having an inductance variable with differences in the flux levels in the member, means for applying to the storage means volt-seconds of intensities and duration to produce flux levels in the magnetizable member over a considerable range of values, means for applying to the storage means an alternating signal having an amplitude insufficient to significantly vary the flux level in the magnetizable member, means for producing output signals having characteristics dependent upon the inductance of the magnetizable member and in accordance with the application of the alternating signals, and means for determining the characteristics of the output signals to provide a determination of the flux level in the magnetizable member.

6. In combination, a storage means including a magnetizable member having properties for producing flux in the member upon the application of a driving force and saturable with fluxes of opposite polarities, means for applying to the storage means a driving force of sufficient duration and intensity for magnetizing the magnetizable member to any particular flux level intermediate the saturating intensities, means for applying to the storage means an alternating signal of insufficient amplitude to materially affect the flux level produced in the magnetizable member by the driving force, means for producing output signals in the magnetizable member in accordance with the flux level produced by the driving force and the characteristics of the alternating signal, and means for determining the characteristics of the output signals to provide an indication of the flux level in the magnetizable member.

7. In combination, storage means including a magnetizable member having properties of producing magnetic flux upon the application of volt-seconds to the storage means member and having an inductance variable in accordance with different flux levels in the member and having properties of being saturable with fluxes of opposite polarities, first, second and third windings magnetically coupled to the magnetizable member and included in the storage means, means for applying to the first winding volt-seconds of an intensity and duration to produce in the magnetizable member a flux level which is intermediate the saturating intensities and which has a value variable over a wide range of values in accordance with the amount of volt-seconds applied to the winding, means for applying to the second winding alternating signals having characteristics for not significantly altering the flux level of the magnetizable member, and means for measuring the characteristics of the signals induced in the third winding to provide an indication of the flux level in the magnetizable member.

8. Apparatus as set forth in claim 7 in which the measuring means includes a resonant circuit for producing signals of optimum amplitude from the third winding without affecting the lack of any significant alteration produced in the magnetizable member by the alternating signals introduced to the second winding.

9. In combination, storage means including a magnetizable element saturable with magnetic fluxes of opposite polarities and having an inductance variable in accordance with changes in the level of magnetic flux between the saturating intensities, pulse producing means inductively associated with the magnetizable element to produce pulses for changing the degree of magnetization of the magnetizable element in accordance with the amplitude, polarity and duration of the pulses and for changing the degree of magnetization of the element from a saturating level of one polarity toward a saturating level of the opposite polarity in a plurality of pulses, alternating signal means inductively associated with the magnetizable element to produce alternating signals having small amplitudes for the retention of the flux in the element at substantially the same level as that produced by the pulse producing means, and means inductively associated with the magnetizable element for providing indications in accordance with the flux level produced in the element by the pulse producing means and upon the application of the alternating signals.

10. Apparatus as set forth in claim 9 in which means are associated with the indicating means to provide a resonant phenomenon and in which the means are tunable to provide resonance at different frequencies in accordance with the variations in the inductance of the magnetizable element at the different flux levels.

References Cited in the file of this patent

UNITED STATES PATENTS

| | | |
|---|---|---|
| 2,252,059 | Barth | Aug. 12, 1941 |
| 2,418,553 | Irwin | Apr. 8, 1947 |
| 2,426,622 | Laird et al. | Sept. 2, 1947 |
| 2,581,209 | Shepard et al. | Jan. 1, 1952 |
| 2,614,167 | Kamm | Oct. 14, 1952 |

OTHER REFERENCES

"Reviews of Modern Physics" (American Physical Society), January 1947, pp. 78–82, 340–174.6.

"Journal of Applied Physics," January 1951, pp. 107–108, 340–174.6.